INVENTOR
William R. Shaffer &
John B. Dunn

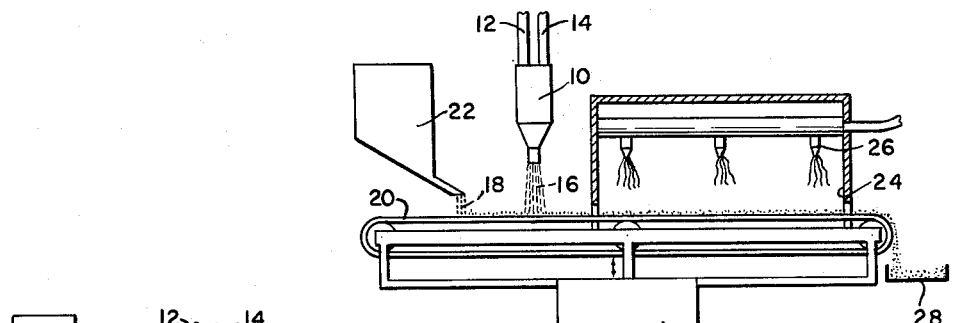
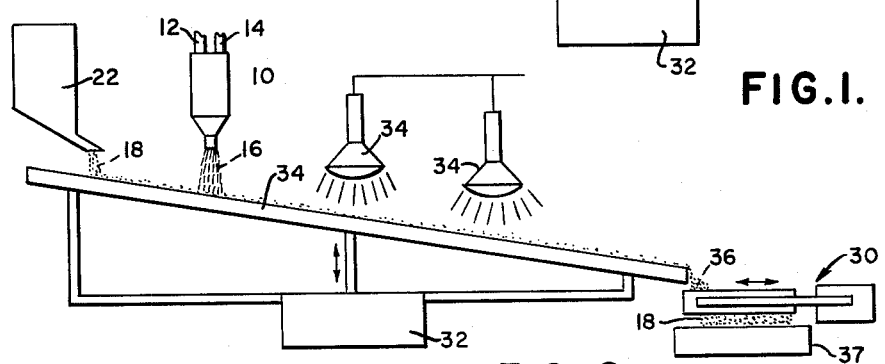
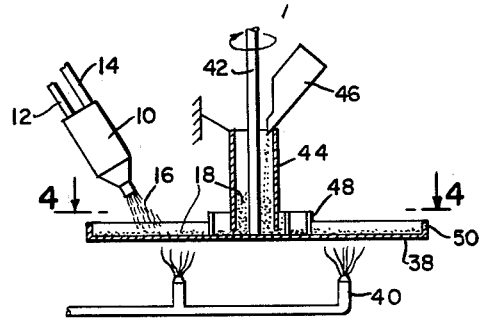
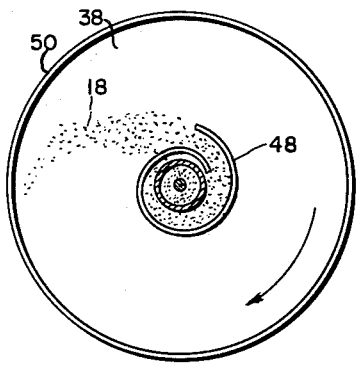
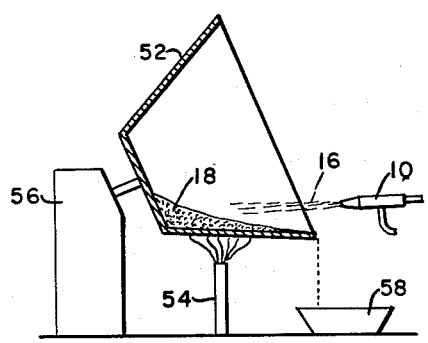
FIG.1.
FIG.2.
FIG.3.
FIG.4.
FIG.5.
INVENTOR
William R. Shaffer &
John B. Dunn
BY *Karl W. Flocks*
ATTORNEY June 7, 1966  W. R. SHAFFER ET AL  3,255,282
REFLECTIVE SPHEROIDS
Filed Feb. 13, 1963  3 Sheets-Sheet 2
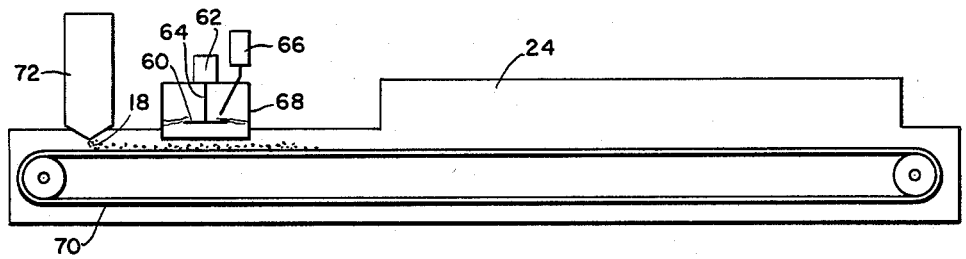
FIG. 6.
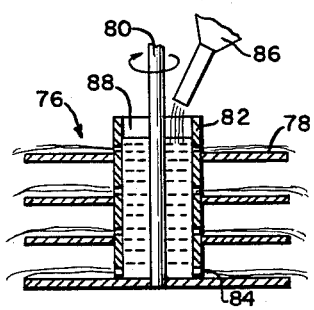
FIG. 7.
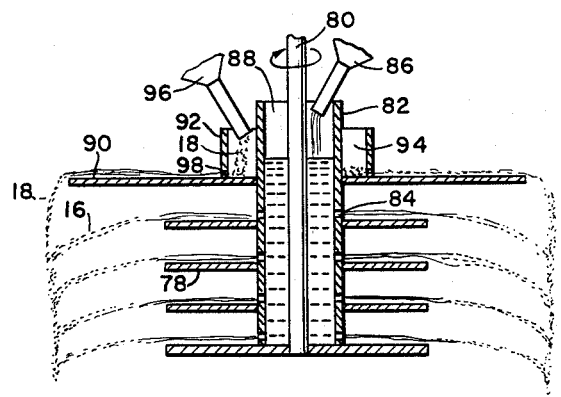
FIG. 8.
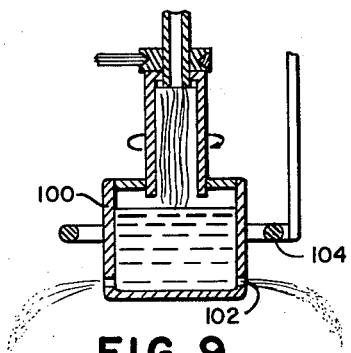
FIG. 9.
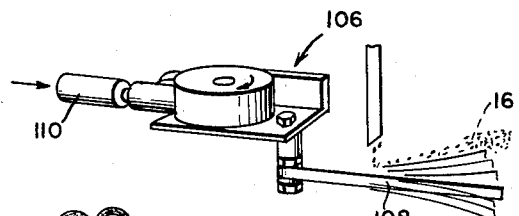
FIG. 10.
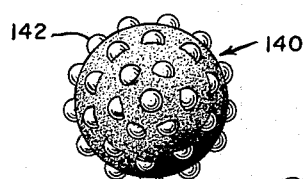
FIG. 18.
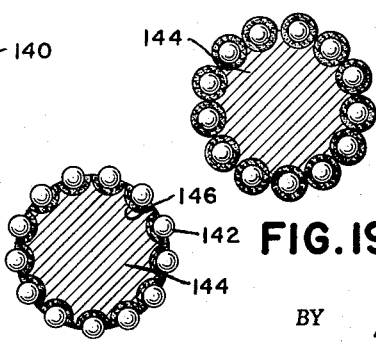
FIG. 19.
FIG. 20.
INVENTORS
William R. Shaffer &
John B. Dunn
BY Karl W. Flocks
ATTORNEY June 7, 1966    W. R. SHAFFER ET AL    3,255,282
REFLECTIVE SPHEROIDS Filed Feb. 13, 1963    3 Sheets-Sheet 3

BY *Karl W. Flocks*

ATTORNEY

United States Patent Office 3,255,282
Patented June 7, 1966

3,255,282
REFLECTIVE SPHEROIDS
William R. Shaffer and John B. Dunn, Huntingdon, Pa., assignors to Prismo Safety Corporation, Huntingdon, Pa., a corporation of Pennsylvania
Filed Feb. 13, 1963, Ser. No. 258,231
6 Claims. (Cl. 264—8)

The present invention relates to the manufacture of reflective spheroids and more particularly to methods and apparatus for making reflective spheroids suitable for use in highway markers.

Heretofore in highway marking and sign manufacture, it has become standard practice to incorporate small glass spheres in the paint either as a pre-mix or by dropping the glass spheres onto the paint while it is still tacky so that the spheres become partially embedded in the paint when it has dried. These spheres render the marker reflex reflective and reflect the light from the headlights of automobiles back to the source.

An improvement over the use of glass spheres has been disclosed in co-pending application Serial No. 322,857, filed November 12, 1963, entitled "Retro-Reflective Particles and Reflective Markers and Compositions Containing Such Particles" owned by a common assignee to the present application.

It is an object of the present invention to provide a novel method of manufacturing reflective spheroids.

It is a further object of the present invention to provide novel apparatus for manufacturing reflective spheroids.

Other objects and the nature and advantages of the instant invention will be apparent from the following description taken in conjunction with the accompanying drawings, wherein:

FIG. 1 is a diagrammatic view of continuous apparatus wherein the spheroids are formed by spraying the resin onto a vibrating moving bed of glass spheres;

FIG. 2 is a diagrammatic view of a continuous apparatus showing the use of a vibrating sloped surface;

FIG. 3 is a diagrammatic view of a rotating turntable arrangement in combination with the nozzle for spraying resin thereon;

FIG. 4 is a top plan view of the rotating turntable of FIG. 3;

FIG. 5 is a diagrammatic view of a rotating tumbler arrangement in combination with the resin spray nozzle;

FIG. 6 is a diagrammatic view of continuous apparatus wherein the spheroids are formed by being flung from a rotating disc;

FIG. 7 is a cross sectional view of an arrangement involving a plurality of rotating discs;

FIG. 8 is a view similar to FIG. 7, further showing a rotating disc for the glass spheres;

FIG. 9 is a cross sectional view of a heated rotating cup for the formation of spheroids;

FIG. 10 is a perspective view of a vibrator for forming spheroids;

FIG. 18 is an enlarged plan view of a reflective spheroid made in accordance with the present invention;

FIG. 19 is a cross sectional view taken through the center of the spheroid of FIG. 18; and FIG. 20 is a cross sectional view similar to FIG. 19 utilizing reflectively coated glass spheres.

Figure 11:
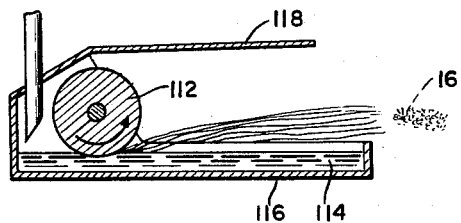
FIG. 11 is a diagrammatic view of a spinning roller for forming spheroids.
Figure 12:
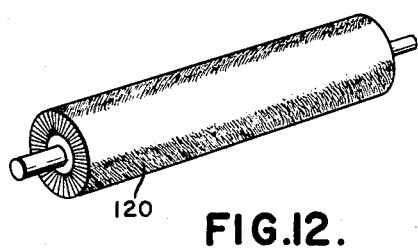
FIGS. 12 through 17 are perspective views of modified forms of rollers.
Figure 13:
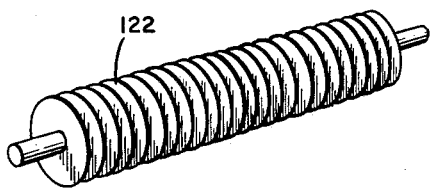

The reflective spheroid made in accordance with the present invention is a suitably solidified binder of generally spherical shape having virtually its entire outer surface covered with small glass spheres which are partially embedded in the binder. These reflective spheroids are manufactured by first forming the binder into liquid discrete small droplets of desired size and then contacting the droplets with a mass of small glass spheres. The individual glass spheres coming into contact with the droplets will become approximately halfway embedded in the droplet. The droplet solidifies into a solid spheroid covered completely with the small glass spheres on its surface. The glass spheres may be heated or non-heated at the time of contact with the droplet, and the spheres may be stationary, falling through space or agitated depending on the method used.

As a binder, particularly good results have been obtained using polyester resin compositions, epoxy resins, thermosetting polystyrene resins, and other thermosetting resins which solidify rapidly while in contact with the glass spheres.

The glass spheres may be maintained at a temperature of 200–400° F. The heated individual glass spheres coming into contact with the binder droplets will lower the viscosity of the binder during the very short interval of time required for the glass spheres to become approximately halfway embedded in the droplet. Immediately however, because of the heat transferred, the droplet now covered with glass spheres starts to cure to a solid spheroid. The curing can be completed when necessary by conveying the coated spheroids into an oven.

When the binder is such that it requires heat for solidifying, the heat may be supplied through the heated beads, by an oven, or by the heated beads followed by heating in an oven. On the other hand, when suitable accelerators are added to the binder and the solidification occurs at room temperatures, then no additional heat is needed.

The binder may be pigmented with a reflective pigment, particularly when lower index of refraction glass spheres are used. On the other hand, when high index glass is used which has an index of refraction high enough such that the point of focus of the light returned is within the spheres, approximately 2.0 or over, the binder need not be reflective since the light will be reflected back from within the spheres and the reflecting backing is no longer required.

When reflectively coated glass spheres are used, after the spheroids have been solidified with the reflectively coated glass spheres on the surface, the resulting spheroids can be used as is or if desired, the outer exposed reflective coating on the glass spheres can be removed by washing the spheroids in nitric acid or the like. The resulting reflecting spheroid has glass beads which are reflectively coated only on their embedded portions. Such spheroids require no reflectivity in the binder used.

The droplets of binder can be formed in various ways as by spraying the binder in liquid condition from a spray gun. The droplets can likewise be formed by flinging the liquid binder from a rapidly spinning flat disc or a rapidly rotating cup. The droplets can also be formed by means of a spinning roller slightly immersed in the liquid binder.

Referring to the drawings, a spray gun nozzle 10 is shown having inlet tubes 12 and 14 for the binder and atomizing air. The droplets of binder 16 are sprayed onto a layer of glass spheres 18 on a vibrating moving conveyor belt 20. The glass spheres 18 are dispensed onto the belt 20 from a dispenser 22. The spheroids formed on the belt are conveyed into an oven 24 heated by gas burners 26, wherein the binder is cured. The cured spheroids are then dropped from the conveyor belt 20 into a receiver 28. The receiver 28 may be in the form of a screening shaker arrangement 30 shown in FIG. 2, for removing the glass spheres 18 which can be returned to the dispenser 22 for re-use. A vibrator 32 is shown connected to the conveyor belt for vibrating the belt so that the glass beads are vibrating when the binder droplets are sprayed thereon to insure that the droplets are completely covered with the partially embedded glass spheres.

Instead of the moving conveyor belt 20, an inclined chute 34 may be used as shown in FIG. 2, which is vibrated by a vibrator 32. Heat may be supplied by heat lamps 34 mounted in proximity to the upper surface of the chute 34. The glass spheres 18 are dispensed from dispenser 22 onto the chute 34 where they are vibrated while passing downwardly beneath the spray gun 10. The droplets of binder 16 contact the vibrating spheres 18 and become completely covered with the spheres and are cured by infra-red lamps 34. The cured spheroids 36 fall into a screening shaker arrangement 30 wherein the excess glass spheres 18 are screened out for return to the dispenser 22, the spheres being collected in vessel 37.

The binder can be sprayed as droplets 16 from spray gun 10 onto a heated rotating turntable 38, heated beneath by gas burners 40. A shaft 42 is connected to the center of turntable 38 for rotation thereof. A cylindrical tube 44 surrounds the shaft 42 and receives glass spheres from a dispenser 46. The cylindrical tube 44 is supported so that it is slightly elevated from the turntable to enable the glass spheres in the tube to flow onto the rotary turntable where they are guided and distributed over the entire surface thereof by means of non rotating screening comb 48. The turntable 38 is provided with an outer flange 50. If desired, additional spray guns 10 may be mounted above the turntable depending upon the size thereof and its speed of rotation. Thus, the spray gun 10 forms small droplets 16 of binder which contact the glass spheres 18 on the rotating turntable 38, thereby forming spheroids which are quickly cured due to the heat of the burners 40.

As shown in FIG. 5, the binder is sprayed from spray gun 10 into a tilted tumbler barrel 52 containing glass spheres 18 and which may be heated by a gas burner 54. The tumbler barrel 52 is rotated by conventional mechanism 56 and is tilted to the position so that the glass spheres are tumbled and tend to roll toward and out of the barrel mouth. The binder droplets 16 from the spray gun enter the barrel and contact the moving glass spheres to form the spheroids which roll out of the barrel into a collector 58, which may be a screening shaker for separating the glass spheres from the spheroids.

The droplet size of the binder can be varied by adjusting the air pressure in the spray gun. The glass spheres were preheated and maintained below a maximum temperature of 350°–400°.

Formation of the droplets of binder by use of spinning discs is shown in FIGS. 6–8. A spinning disc 60 is rapidly rotated by a motor 62 and shaft 64 while the binder in liquid form is applied thereon in drop form from a dispenser 66. A speed of 100–250 r.p.m. is preferred. As shown, a housing 68 surrounds the rotating disc 60. Due to centrifugal force the binder drops are broken up into small droplets and fall onto the bed of glass spheres below. As shown in FIG. 6 the glass spheres 18 are dispenser onto a moving belt 70 from a dispenser 72. The conveyor belt 70 may be vibrated and passes through an oven 24, all as shown in FIG. 1. Suitable collection and screening means (not shown) are also provided to collect the spheroids formed on the moving conveyor belt 70.

A rotating device 76 having a plurality of discs 78 as shown in FIGS. 7 and 8 may be used. As shown in FIG. 7, the lowermost disc 78 is connected to the shaft 80 and to a cylindrical tube 82 surrounding and co-axial with the shaft 80. The additional discs 78 extend outwardly from the cylindrical tube 82 and have the same outer diameter. The cylindrical tube 82 has a plurality of rows of perforations 84, each row being located slightly above one of the discs 78. A dispenser 86 supplies liquid binder into the space 88 enclosed by the tube 82. The binder passes through the perforations 84 onto the discs 78 and is flung outwardly by centrifugal force forming small droplets which fall onto a bed of glass spheres and pick up the glass spheres to form the spheroids of the present invention.

FIG. 8 shows a modification to the structure of FIG. 7 wherein an upper disc 90 is provided over the uppermost disc 78, the disc 90 having a larger outer diameter than the discs 78. A cylindrical tube 92 is attached to the upper surface of the disc 90; the tube 92 being of larger diameter and coaxial to the tube 82. The space 94 between the tube 82 and the tube 92 is supplied with glass beads 18 from a dispenser 96. The glass beads pass through perforations 98 near the bottom of tube 92 onto the disc 90 from whence they are flung outwardly to form a curtain of glass spheres. The droplets of binder 16 formed by the discs 78 pass through this curtain of glass spheres and form the spheroids.

As an alternative, a perforated rotating cup 100 may be used having a plurality of perforations 102 through which droplets of binder are flung outwardly into contact with glass spheres. The cup 100 may be heated by an electrical coil 104 surrounding the cup or by gas burners.

The droplets of binder 16 can also be formed by dropping liquid binder onto a vibrator 106 as shown in FIG. 10. The vibrator 106 includes a metal strip 108 which flings the binder outwardly into the droplets 16 which are brought into contact with the glass spheres. Good results were obtained with a ½" wide spring steel tape vibrated by a model BD vibrator actuated by air entering the tube 110.

Figure 14:
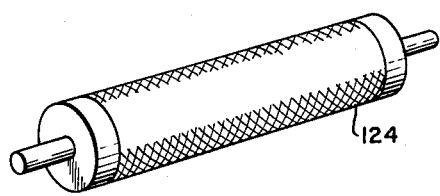
Figure 15:
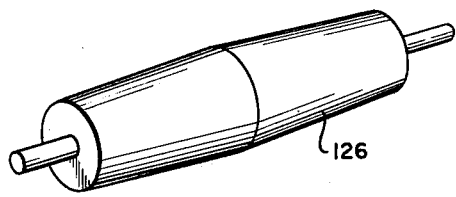
Figure 16:
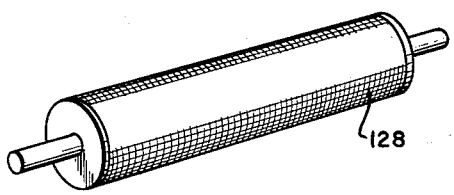
Figure 17:
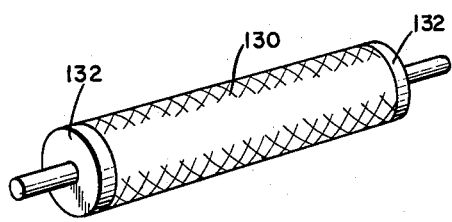

Droplets of binder of the proper size may be formed by a roller which rotates while slightly immersed in a container holding the liquid binder. As shown in FIG. 11, a roller 112 is immersed approximately 1/16" in liquid binder 114 contained in a vessel 116. A baffle 118 is provided to direct the spray of droplets 16. A speed of approximately 1250–1500 r.p.m. was found to give good results. Various forms of rollers 112 may be utilized. The roller 112 may be in the form of a brush having bristles 120. A roller comprised of a plurality of narrow discs or rollers 122 may be used. FIG. 14 shows a roller having a knurled surface 124. FIG. 15 shows a crowned roller 126. FIG. 16 shows a roller in the form of a mesh 128 of approximately ⅛" squares in sleeve form over a mandrel. FIG. 17 shows a bird cage type of roller using a coarse mesh sleeve 130 attached to wooden ends 132. The roller may also be a smooth polished surface.

The droplets of binder formed by the apparatus described above may be spun along the surface of a layer of glass spheres picking up spheres on their surfaces in the nature of a rolling snowball. The spheroids so formed may then be heated to yield the final cured spheroids.

A spheroid in accordance with this invention is shown in FIGS. 18 and 19. The spheroid 140 has glass spheres 142 partially embedded in the outer surface thereof and the core 144 of binder has no glass spheres therein. When reflectively coated glass spheres are used, the outer reflective coating is removed from the exposed surfaces of the glass spheres so that each glass sphere has the reflective coating 146 on the embedded portion thereof only as shown in FIG. 20.

As the binder, polyesters, thermosetting polystyrene, epoxies and other thermosetting materials may be used so long as they cure by heat or catalyst while in contact with the glass spheres so that the glass spheres become partially embedded therein.

The binders may include other materials such as pigments and fillers, catalysts, accelerators, solvents and the like as necessary.

Particularly good results have been obtained using polyester resin compositions as the binder. In general, these compositions comprise an unsaturated polyester resin and a monomeric polymerizable material that does not give off volatile matter during curing.

Polyester resins are a class of resins, which is well known to those skilled in the art. In general, polyester resins are unsaturated alkyd resins formed by the reaction of one or more dicarboxylic acid components and one or more polyhydric alcohols. Illustrative of the dicarboxylic acid components are the saturated components phthalic anhydride and adipic and azelaic acids, and the unsaturated components, fumaric acid and maleic acid. Illustrative of the dihydric alcohols most commonly used are glycols of ethylene, propylene, 1,3- and 2,3- butylene, diethylene and dipropylene. An unsaturated monohydric alcohol, such as allyl alcohol, may be used in place of part of the polyhydric alcohol. One or more of the acid components or polyhydric alcohols should contain a reactive double or ethylene linkage. It is essential that one of the components of the polyester resin contain an unsaturated ethylenic linkage. The polyester reaction products are mixed with a non-volatile unsaturated monomeric crosslinking agent for the polyester resin. Illustrative of the monomeric agents are the unsaturated hydrocarbons, such as styrene, vinyl toluene, vinyl acetate, methyl methacrylate, alpha and para methyl styrene, divinyl benzene, ethyl acrylate, acrylonitrile, diallyl esters, cyclo pentadiene, triallyl cyanurate and many others. The monomeric agent serves to make the polyester resin more fluid and also to crosslink the resin at the time of curing to produce a crosslinked or three dimensional polyester resin, which is thermosetting in character. The monomeric agent is of a nature that it is consumed during the curing of the resin without forming volatile materials.

The properties of the polyester resin compositions can be varied through the use of various dibasic acids, different gylcols, and different monomers, each in varying ratio to the others, permitting preparation of end products with almost any desired properties.

Suitable catalysts which are added to the formulation to cure the polyester resin composition may be selected from a large number of oxidizing catalysts such as benzoyl peroxide, di-t-butyl peroxide, 2,4- dichlorobenzoyl peroxide, methyl ethyl ketone peroxide, cyclohexane peroxide, cumene hydroperoxide, bis (parabromobenzoyl) peroxide, bis (phthalyl) peroxide, bis (parachlorobenzoyl) peroxide, bis (succinyl) peroxide, acetyl benzoyl peroxide, bis (chloroacetyl) peroxide, bis (acetyl) peroxide, tertiary-butyl hydroperoxide, bis (dichlorobenzoyl) peroxide, and 2,2-bis (tertiary-butyl peroxy) butane, with which those skilled in the art are familiar. For rapidly curing polyester compositions, the catalyst at least in part is benzoyl peroxide.

Accelerators for the polyester composition may be added to impart glossiness, to minimize stickiness of the material and primarily to decrease the time necessary for gelation or cure of the resin at room temperatures.

Illustrative of the accelerators are the cobalt, manganese, vanadium, calcium and iron soaps of organic acids, such as the naphthenates, dimethylaniline, and mixtures of dimethylaniline with ethylene diamine, diethylene triamine triethylene tetramine, tridimethyl amino methyl phenol, and other primary, secondary and tertiary amines.

The epoxy resins employed in accordance with the present invention are commonly referred to as poly glycidyl ethers of polyhydric alcohols and glycidyl ethers of bis-phenols, characterized by the following general formula:

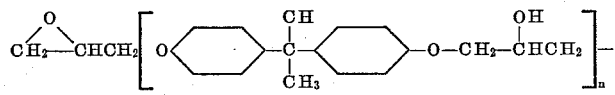 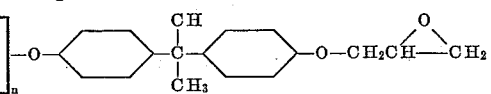

wherein $n$ represents the extent of copolymerization and varies between 0 and 10 indicating molecular weights of 400 to approximately 8,000. These products contain both epoxide and hydroxyl groups capable of further reaction.

It is the combination of these groups with the curing agent that results in the cured resin systems. Various amines, such as ethylene diamine, triethylene tetramine, dimethyl amino methyl phenol, tri (dimethyl amino methyl) phenol, diamino diphenyl sulfone, metaphenylene diamine, and diethyl aminopropylamine, acid anhydrides, organic sulfonic acids, dibasic acids and resins, such as polyamides, are typical curing agents.

The epoxy resins are commercially sold by Shell Chemical Corp. under the trade names of Epons. Epon 828, for example, has a melting point of 8–12° C. and an epoxide equivalent ranging between 190–210. By the epoxide equivalency is meant the average number of 1,2-epoxy groups contained in the average molecule. It is expressed in the trade as the grams of the polymeric material or resin containing one gram equivalent of epoxide.

It should be understood that the epoxy resins suitable for use in this invention are not limited to those described above. Any resinous material containing reactive epoxy groups whether aliphatic or aromatic, may be used so long as the material will cure in the presence of curing agents to a solid condition. For example, a dicyclodiepoxy carboxylate resin may be used which is sold by Union Carbide and Carbon Co. as Epoxide 201.

When an epoxy resin is used as the binder, a heat sensitive catalyst may be used which yields a composition that is stable at room temperatures and which cures when heated. Such a catalyst is a boron fluoride amine complex.

The heated glass spheres will cause the binder to cure, and an additional heating in an oven can be accomplished to complete the curing if necessary. When the glass beads are not heated, the heat can be applied externally.

Pigment may be added to the binder to impart reflection to the composition as well as color and opacity. To produce a white reflecting composition, it is necessary to have a prime pigment, such as rutile titanium dioxide, to furnish the necessary whiteness and opacity. In place of the rutile titanium dioxide, anatase titanium dioxide may be substituted. Other pigments that may be used for white and colored compositions are as follows: aluminum oxide, iron oxide, silicon carbide, antimony oxides, lead oxide, lead chromates, zinc chromates, cadmium pigments, siennas, umbers, inorganic or organic reds, chrome yellows, chrome oranges, chrome greens, etc. The pigments can be extended with varium sulphate, calcium sulphate, magnesium silicate, zinc oxides, zinc sulphide, normal or high strength lithopones, diatomaceous silica, amorphous and crystalline silica, micaceous materials, barium sulphate, whiting, wollastonite pumices, calcium carbonate, clay, talc, perlite, asbestos, granular marble, sand, glass cullet, and other natural or manufactured granular materials.

Specific examples of formulations which have given excellent results are described in copending application Serial No. 61,998 filed October 11, 1960.

If desired, an aluminum powder or flake can be incorporated in the binder. For certain purposes a filler of glass cullet or gold or silverized glass cullet or flakes can be incorporated in the binder.

The size of the reflective spheroids is not critical as it is somewhat dependent on the size of the glass spheres incorporated. The preferred size is a diameter of spheroid which is 2 to 10 times the diameter of the glass spheres used.

The reflective spheroids may in accordance with the present invention have many advantages over the use of glass spheres alone. First of all, much better results are obtained in traffic lines due to the wide angle visibility which is much wider than with glass spheres alone. The color return at grazing angles is very white. This may be explained because the light hits the side of the spheroid with the beads embedded. In this way, the observer, the light, the embedded bead and the background are in a straight line. On the other hand, with glass spheres the light is mostly at grazing angles and the light must be refracted downwards first and then back out in order to pick up the white color. Obviously, only a certain percentage of the light is reflected in this way.

Further, the reflective spheroids of this invention have a weight advantage over glass spheres since the composite reflective spheroid has approximately one-half the specific gravity of glass. Since the spheroids may be pigmented, less pigment, or none at all is required in the paint binder. Thus, the spheroids may be added to a clear binder and still give colored light return.

The size of glass spheres used in the spheroids and their index of refraction can be varied over wide limits. The spheres can range from ½ mil up to 30 mils depending to some extent on the size of the reflective spheroid being made. The glass spheres can be clear transparent glass or for certain purposes they may be reflectively coated spheres such as silvered glass spheres or even metallic spheres. The index of refraction of the glass may vary for different purposes from approximately 1.5 up to a high index glass of over 2.0.

It will be obvious to those skilled in the art that various changes may be made without departing from the scope of the invention and, therefore, the invention is not limited to what is shown in the drawings and described in the specification but only as indicated in the appended claims.

What is claimed is:

1. A method of making reflective spheroids which comprises forming a plurality of small droplets of a thermosetting material by rapidly rotating a roller which is slightly immersed in the liquid thermosetting material to project a plurality of said droplets, passing said droplets in liquid form while still moving into contact with a plurality of small glass spheres, and solidifying said droplets to form reflective spheroids of said material covered with said glass spheres partially embedded in the outer surfaces thereof.

2. The method of claim 1 wherein said roller is in the form of a brush having bristles.

3. The method of claim 1 wherein said roller is in the form of a plurality of discs mounted adjacent one another.

4. The method of claim 1 wherein said roller is in the form of a mesh.

5. The method of claim 1 wherein said roller has a knurled surface.

6. The method in accordance with claim 1 wherein said roller is rotated at a speed of approximately 1250–1500 r.p.m. while immersed approximately $\frac{1}{16}''$ in said material.

References Cited by the Examiner

UNITED STATES PATENTS

| | | | |
|---|---|---|---|
| 721,445 | 2/1903 | Holmstrom | 134—193 |
| 979,071 | 12/1910 | Holmstrom | 134—193 |
| 1,294,909 | 2/1919 | Howell | 264—8 |
| 1,352,623 | 9/1920 | Perry | 264—8 |
| 1,383,010 | 6/1921 | Olsen | 134—194 |
| 2,562,149 | 7/1951 | Mollring | 18—2.4 |
| 2,624,356 | 1/1953 | Rumbaugh | 134—194 |
| 3,043,196 | 7/1962 | Palmquist et al. | 88—79 |
| 3,050,824 | 8/1962 | Lemelson | 88—82 XR |

FOREIGN PATENTS

| | | |
|---|---|---|
| 15,410 | 11/1903 | Austria. |
| 887,994 | 11/1943 | France. |
| 25,744 | 11/1904 | Great Britain. |
| 284,704 | 9/1928 | Great Britain. |

ALEXANDER H. BRODMERKEL, *Primary Examiner.*

ROBERT F. WHITE, *Examiner.*

P. E. ANDERSON, F. WHISENHUNT, *Assistant Examiners.*